No. 668,685. Patented Feb. 26, 1901.
P. LIER.
VEHICLE SPRING.
(Application filed Nov. 19, 1900.)
(No Model.)

Paul Lier Inventor

Witnesses

United States Patent Office.

PAUL LIER, OF EMERSON, NEBRASKA, ASSIGNOR OF ONE-HALF TO LOUIS KRUSE, OF SAME PLACE.

VEHICLE-SPRING.

SPECIFICATION forming part of Letters Patent No. 668,685, dated February 26, 1901.

Application filed November 19, 1900. Serial No. 37,042. (No model.)

*To all whom it may concern:*

Be it known that I, PAUL LIER, a citizen of the United States, residing at Emerson, in the county of Dixon and State of Nebraska, have invented a new and useful Vehicle-Spring, of which the following is a specification.

This invention relates to a novel vehicle-spring or resilient device for interposition between the axle and wagon-body, between the body and seat, or in any other relation which requires a resilient support for an element subjected to vibrations intended to be absorbed by the spring.

One object of the invention is to produce a supporting-spring of the character specified equipped with means for adjusting its tension to secure such stiffness of the spring as may be desired in accordance with the nature of the element to be supported.

A further object of the invention is to secure the advantages which arise from the use of elliptical springs—that is, such advantages as arise from the form thereof—while at the same time securing the desired resiliency by the employment of a stout spiral spring equipped with means for regulating the tension thereof to present more or less resistance to the collapse of the spring-frame of which this spiral spring constitutes the principal reactive element.

To the accomplishment of the objects stated and others which will hereinafter appear the invention consists in the construction and arrangement of parts to be described, illustrated in the accompanying drawings, and defined in the appended claims.

Figure 1:
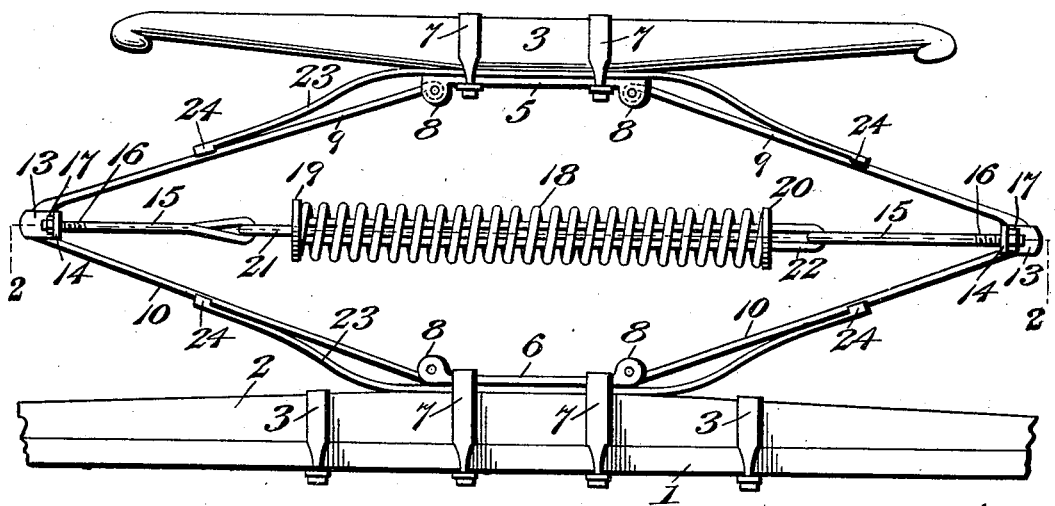
Figure 2:
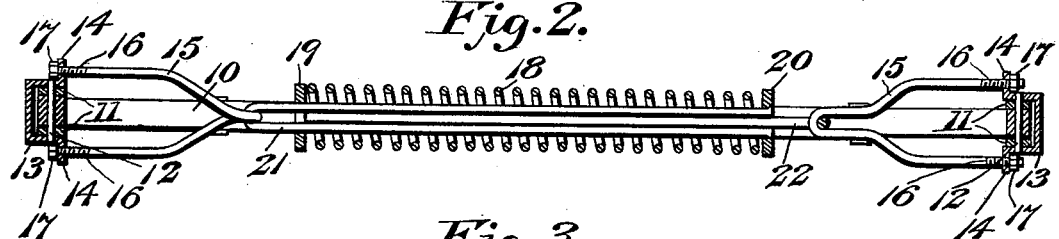
Figure 3:
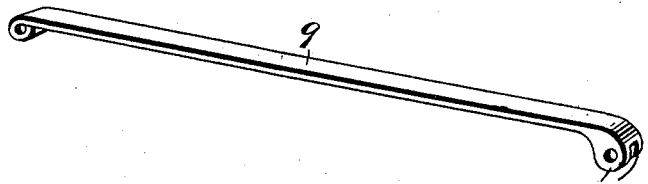
Figure 4:
Figure 5:

In said drawings, Figure 1 is an elevation of my device supported upon the axle of a vehicle and designed to effect the support of the vehicle-body. Fig. 2 is a longitudinal sectional view on the line 2 2 of Fig. 1. Fig. 3 is a detail perspective view of one of the pivoted members of the spring-frame. Fig. 4 is a similar view of one of the fixed members, and Fig. 5 is a detail sectional view of one end of one of the stationary frame members.

Referring to the numerals employed to designate corresponding parts throughout the views, 1 indicates the axle of a vehicle, 2 the axle-bolster secured to the axle by means of clips 3, and 4 the body-bolster, designed to be secured to the vehicle-body (not illustrated) in the ordinary manner.

5 and 6 indicate the fixed members or supporting-plates of the spring-frame secured, as by clips 7, to the bolsters 2 and 4 and provided, respectively, with terminal bearing-ears 8, between which are pivoted the inner ends of the upper and lower pivoted members 9 and 10 of the diamond-shaped spring-frame. The outer or contiguous ends of the opposed upper and lower members are pivotally connected by forming the bearing-ears 11 upon the members 9 for the interposition of the end of the adjacent member 10, with which a pivotal connection is effected by means of a pintle 12. Each of the pintles also serves as a support for a substantially U-shaped bracket 13, inclosing the knuckle formed by the pivoted ends of the upper and lower members and provided with oppositely-extending ears 14. Each bracket 13 is designed for the attachment of a loop 15, the legs of which are threaded, as indicated at 16, and are passed through the ears 14 of the adjacent bracket 13 and equipped with nuts 17, by means of which the loops are drawn up for the purpose of regulating the tension of the tension device to be described. Instead of forming the ears 14 on separate brackets they may, if desired, be cast upon the bearing-ears 11 of the upper members 9; but this is not essential and may or may not be varied to suit the ideas of the individual manufacturer or user.

It will now be observed that the collapse of the pivoted frame—that is to say, the approach of the fixed frame members or plates 5 and 6 under a load imposed upon the body of the wagon—will necessitate the spreading apart of the outer ends of the frame, and it will therefore be evident that any force exerted against this spreading of the frame will resist the collapse of the latter in a vertical or transverse direction. I therefore provide tension mechanism in the form of a stout spiral spring 18, against the opposite ends of which are disposed the disks or heads 19 and 20, connected to tension-rods 21 and 22. The tension-rods are preferably doubled and are passed into the spring from opposite ends and connected, respectively, to the heads 19 and 20, so that as the outer ends of the tension-rods are connected to the inner ends of the loops 15 the spreading apart of the opposite ends of the spring-frame will of necessity urge the heads 19 and 20 toward each other against the resistance opposed by the spring 18. It will therefore appear that the spring 18 will absorb such vibrations as may be imparted to the axle and will give the wagon body, seat, or other supported element an easy springy movement conducive to the comfort of the occupants of the vehicle. Obviously the tension of the spring and the stiffness of the frame may be regulated by screwing the nuts 17 in one direction or the other, and by reason of this regulation the device may be employed with equal facility for the support of heavy wagon-bodies or of light seats.

For the purpose of preventing lateral movement of the pivoted frame members and for insuring their smooth antirattling movement I interpose between each of the fixed members 5 and 6 and the adjacent bolster a guide-spring 23, having its opposite ends bent into contact with the adjacent pivoted members and provided with guide-flanges 24, engaging the opposite edges of the members to compel the latter to move in predetermined paths. It will be obvious, however, that these guide-springs constitute auxiliary tension devices, which after the frame has been spread or collapsed to some extent will oppose an auxiliary resistance to further collapse of the frame and will augment the action of the principal tension or reactive device 18.

From the foregoing it will appear that I have produced a simple and highly-efficient vehicle-spring comprising a collapsible diamond frame composed of pivoted members and yieldingly sustained by reactive or tension mechanism the tension of which is adjustable and the action of which is augmented by auxiliary tension devices which also constitute guides for the members of the frame; but while the present embodiment of my invention appears at this time to be preferable I do not wish to limit myself to the structural details defined, but reserve the right to effect such changes, modifications, and variations as may be properly comprehended within the scope of the protection prayed.

What I claim is—

1. A vehicle-spring comprising a spring-frame composed of a plurality of pivoted members, primary tension mechanism opposing the collapse of said frame and a secondary tension device.

2. A vehicle-spring comprising a spring-frame composed of pivotally-connected, inflexible pivoted members, a primary tension device opposing the collapse of said frame, and a secondary tension device.

3. A vehicle-spring comprising a diamond spring-frame composed of pivotally-connected, inflexible pivoted members, an adjustable tension device located between and resisting the outward movement of the ends of the frame, and auxiliary tension devices opposed to the movement of the upper and lower pivoted members and bearing directly thereon.

4. A vehicle-spring comprising a diamond spring-frame composed of fixed members, pivoted members hinged at their inner ends to the opposite ends of the fixed members and pivotally connected at their outer extremities, a spring located within the frame and opposed to the spreading of the opposite ends thereof, and means for regulating the tension of said spring.

5. In a vehicle-spring, the combination with a frame comprising a pair of fixed members, pivoted members connected to the opposite ends of the fixed members and to each other, a primary tension device located within the frame and opposed to the spreading of the opposite ends thereof, and springs retained by the fixed members and having their opposite ends bearing upon the adjacent pivoted members.

6. A vehicle-spring comprising a frame composed of fixed members, pivoted members connected to the opposite ends thereof and to each other, apertured ears extending from the ends of the frame, adjustable loops connected to said ears, tension-rods connected to said loops and provided with heads, and a compression-spring located between said heads.

7. A vehicle-spring comprising a frame composed of fixed members, pivoted members connected to the opposite ends thereof and to each other to form a diamond frame, brackets provided with ears and secured to the opposite ends of the frame by the pintles connecting the pivoted members, loops having threaded legs passed through said ears and provided with nuts for adjusting said loops, tension-bars connected to the loops and provided with heads, and a compression-spring intermediate of said heads.

8. A vehicle-spring comprising a frame composed of fixed members, pivoted members connected to the opposite ends thereof and to each other to form a diamond frame, brackets provided with ears and secured to the opposite ends of the frame by the pintles connecting the pivoted members, loops having threaded legs passed through said ears and provided with nuts for adjusting said loops, tension-bars connected to the loops and provided with heads, a compression-spring intermediate of said heads, and guide-springs retained by each of the fixed members and having their opposite ends bearing against contiguous pivoted members, said springs being provided with terminal guide-flanges engaging the opposite sides of the pivoted members to prevent lateral movement thereof.

9. A vehicle-spring comprising a spring-frame composed of upper members each having an individual pivotal mounting at its inner end, lower members pivoted at their outer ends to the upper members and likewise pivoted individually at their inner ends, and tension mechanism opposing the collapse of the frame.

10. A vehicle-spring comprising a spring-frame composed of upper members each having an individual pivotal mounting at its inner end, lower members pivoted at their outer ends to the upper members and likewise pivoted individually at their inner ends, and tension mechanism disposed upon the exterior of the frame and opposing the collapse thereof.

11. A vehicle-spring comprising a spring-frame composed of upper members each having an individual pivotal mounting at its inner end, lower members pivoted at their outer ends to the upper members and likewise pivoted individually at their inner ends, and tension mechanism disposed upon the interior of the frame and opposing the collapse thereof.

In testimony that I claim the foregoing as my own I have hereto affixed my signature in the presence of witnesses.

PAUL LIER.

Witnesses:
   GEO. H. HAASE,
   A. A. DAVIS,
   F. T. HAASE.